No. 779,977. PATENTED JAN. 10, 1905.
W. J. STERLING.
MOLDING MACHINE.
APPLICATION FILED MAR. 7, 1904.
7 SHEETS—SHEET 1.
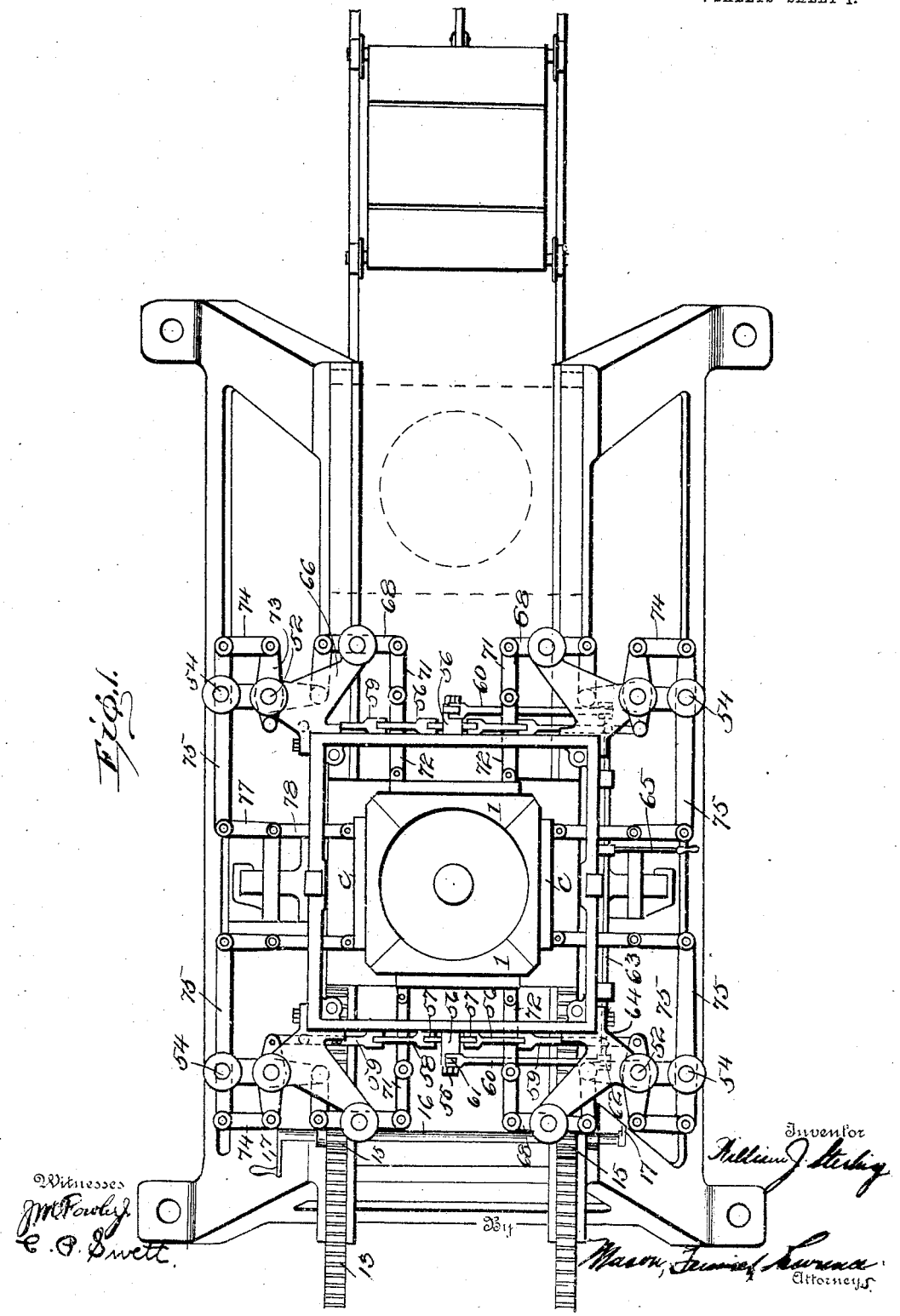

No. 779,977. PATENTED JAN. 10, 1905.
W. J. STERLING.
MOLDING MACHINE.
APPLICATION FILED MAR. 7, 1904.
7 SHEETS—SHEET 2.
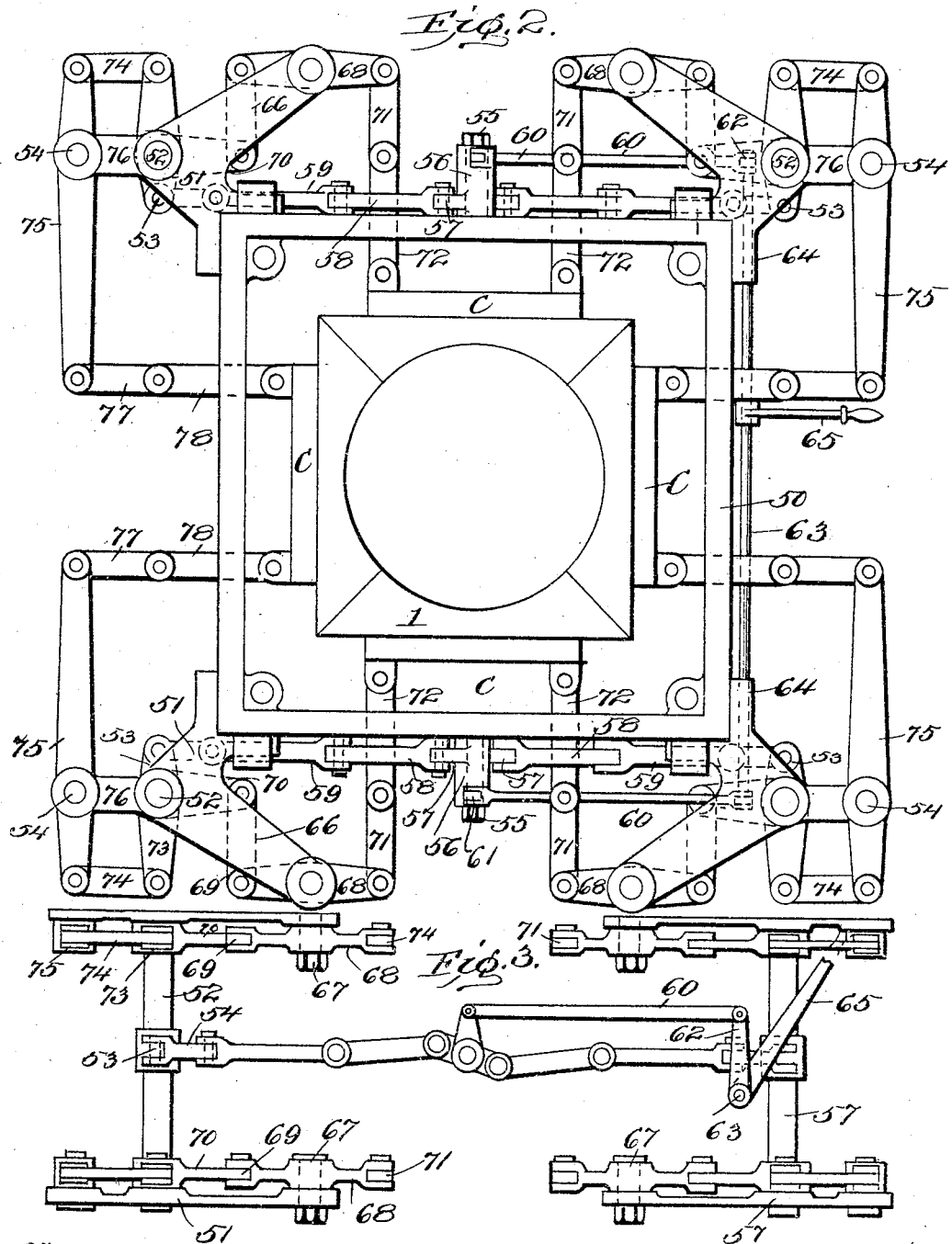

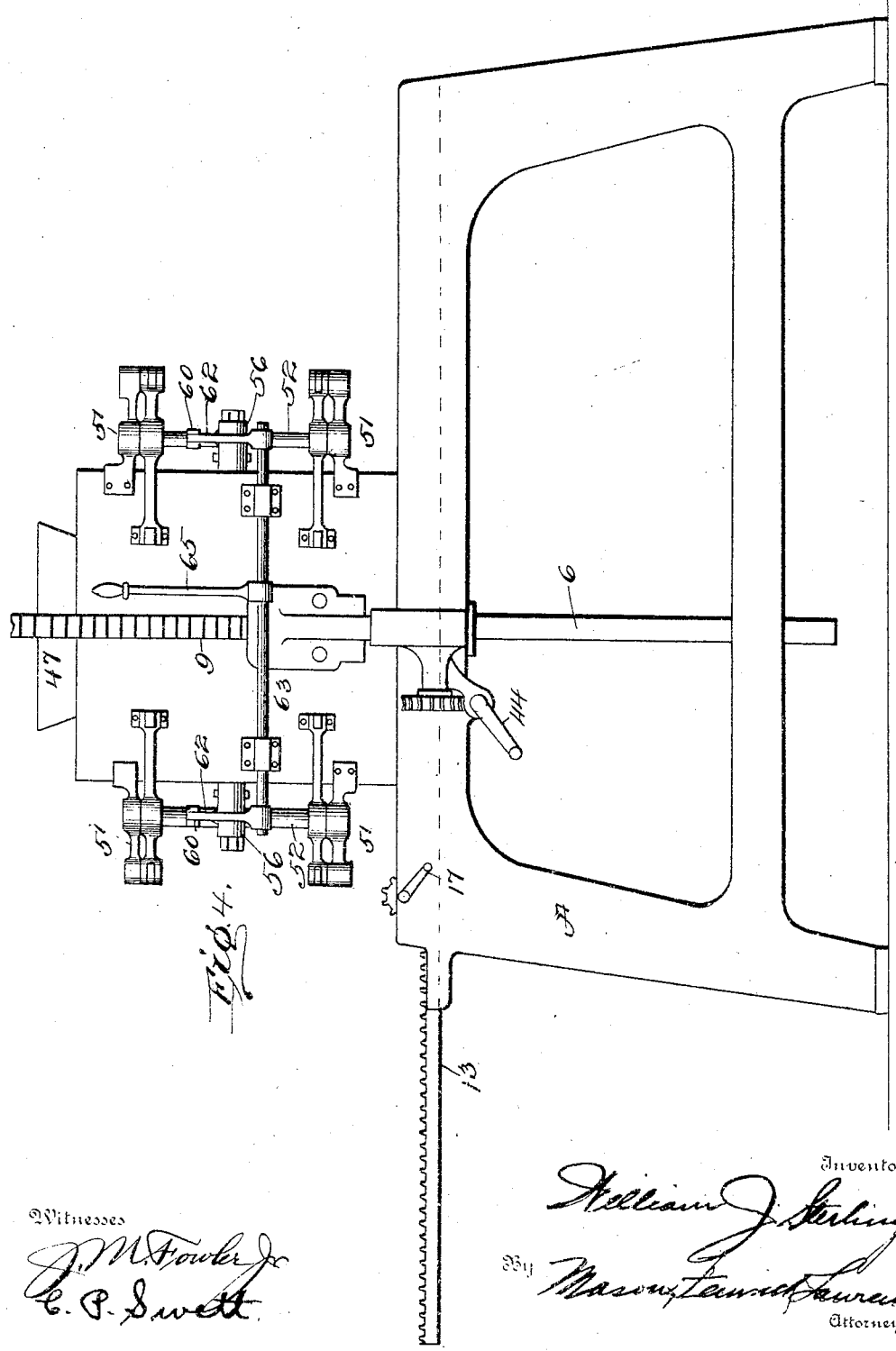

No. 779,977. PATENTED JAN. 10, 1905.
W. J. STERLING.
MOLDING MACHINE.
APPLICATION FILED MAR. 7, 1904.
7 SHEETS—SHEET 4.
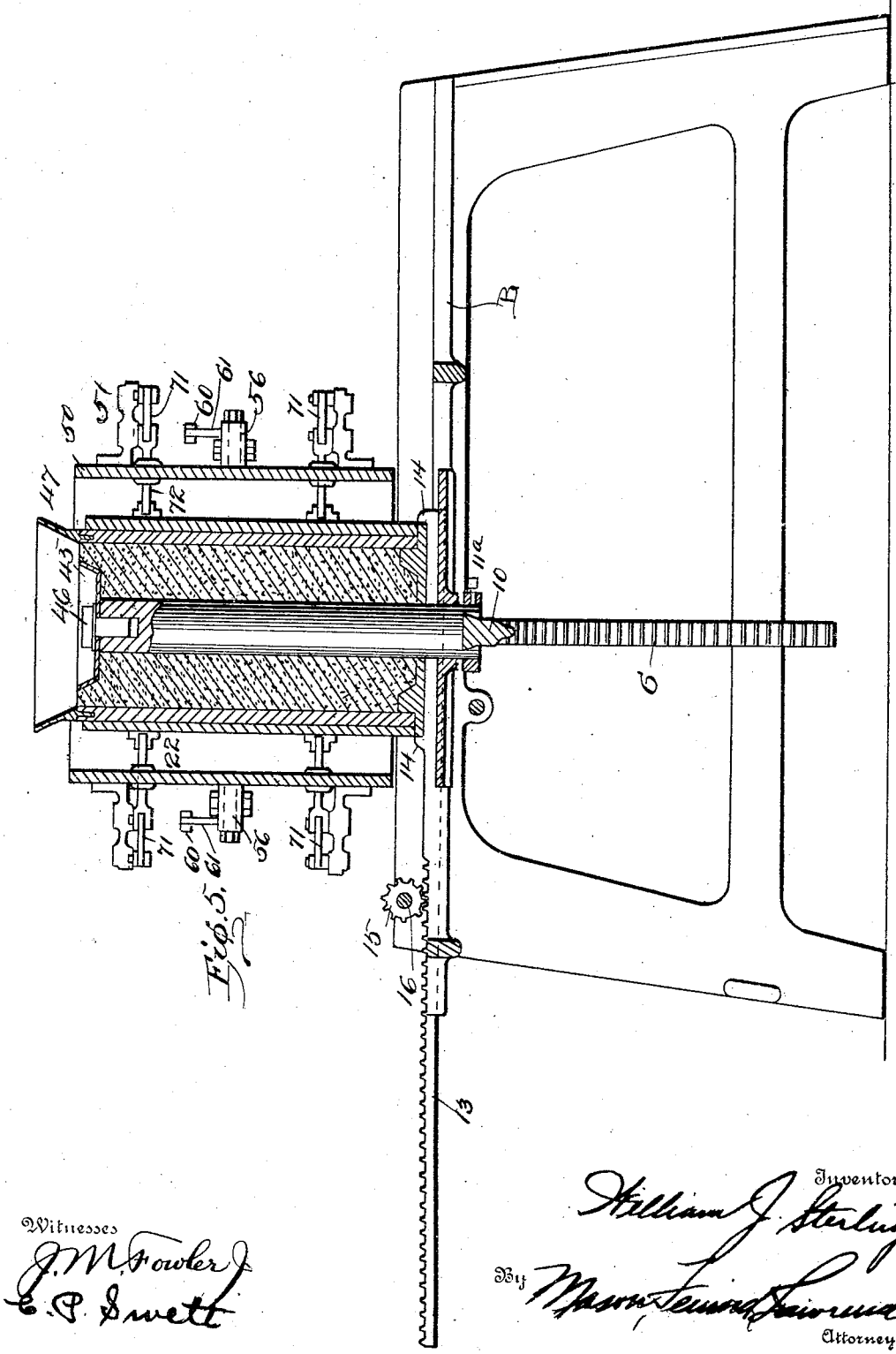

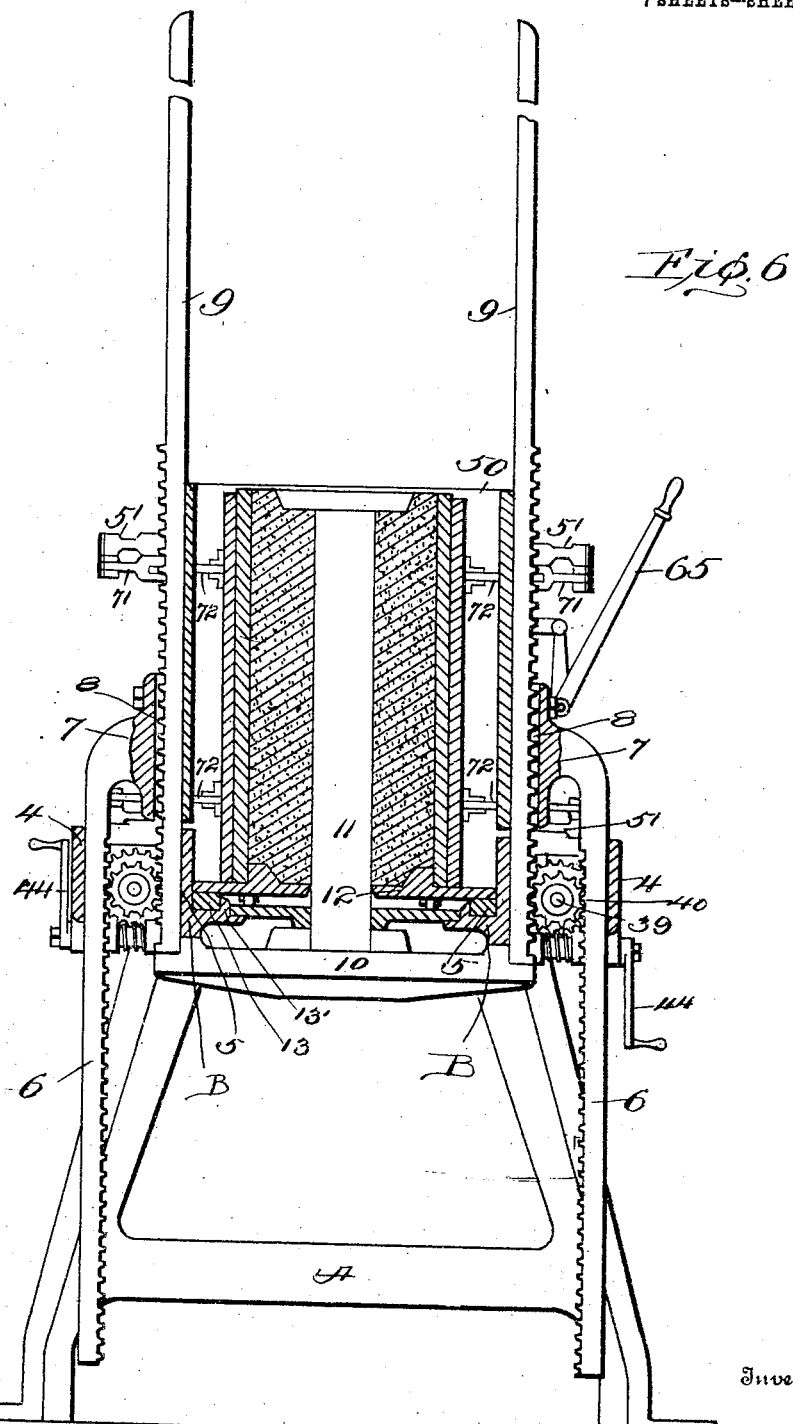

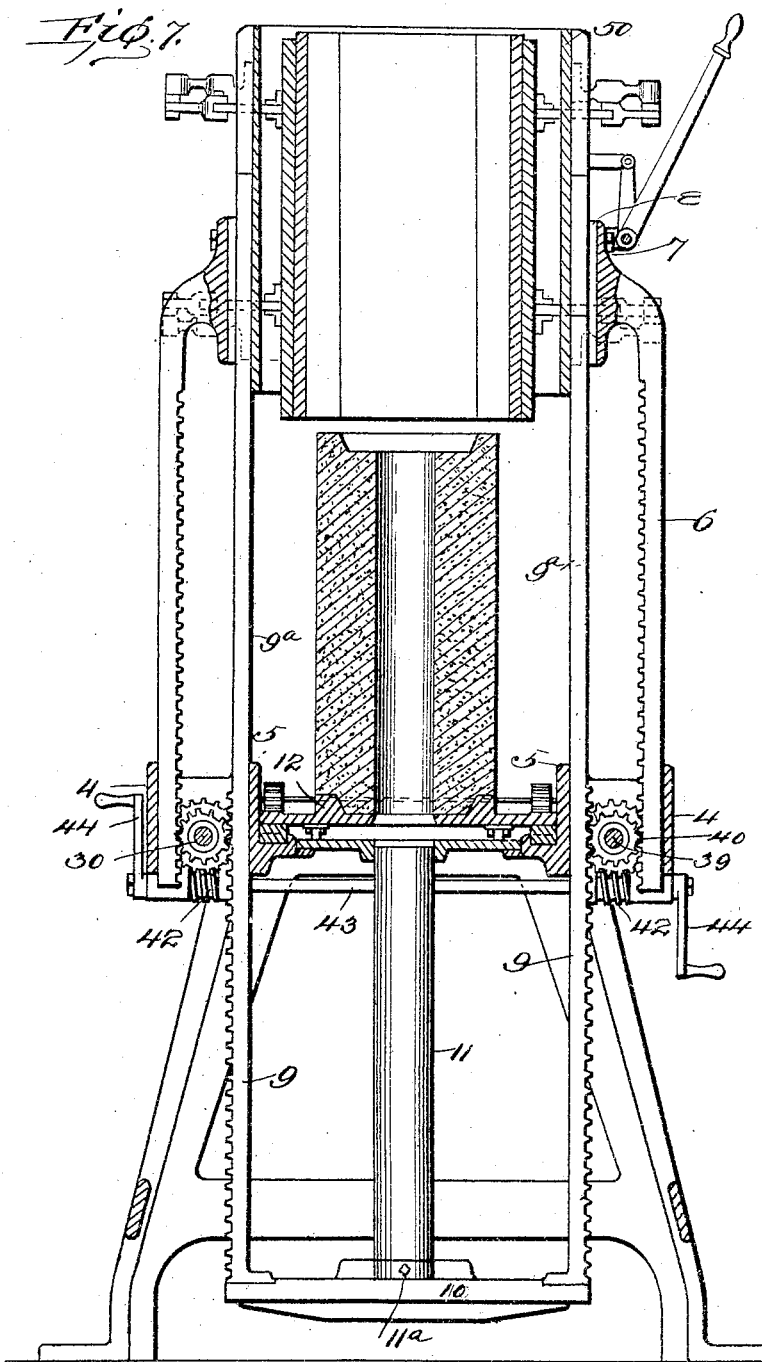

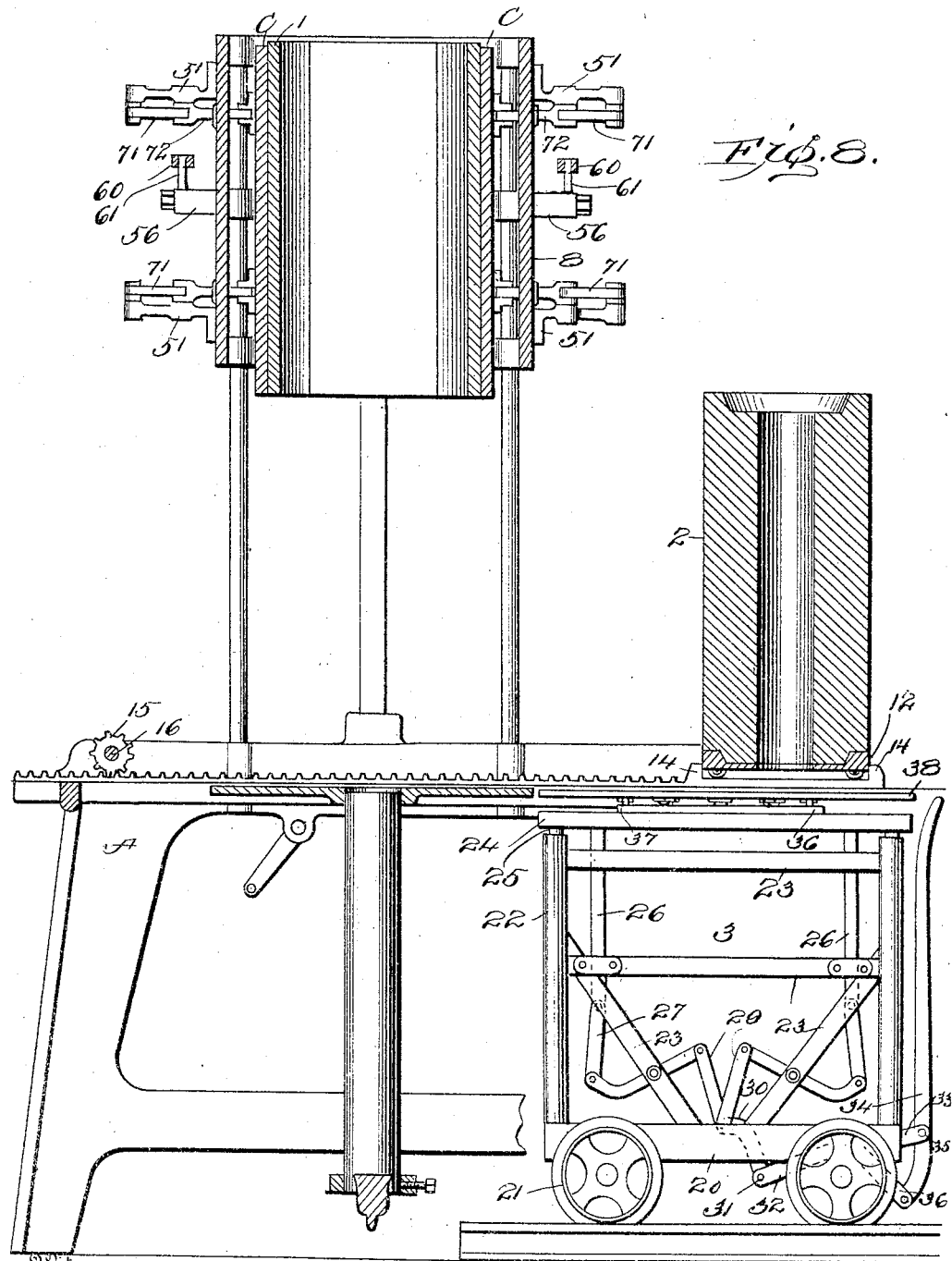

No. 779,977. Patented January 10, 1905.

UNITED STATES PATENT OFFICE.

WILLIAM J. STERLING, OF NORFOLK, VIRGINIA, ASSIGNOR OF TWO-THIRDS TO A. S. J. GAMMON AND C. C. GRAVES, OF NORFOLK, VIRGINIA.

MOLDING-MACHINE.

SPECIFICATION forming part of Letters Patent No. 779,977, dated January 10, 1905.

Application filed March 7, 1904. Serial No. 197,046.

*To all whom it may concern:*

Be it known that I, WILLIAM J. STERLING, a citizen of the United States, residing at Norfolk, in the county of Norfolk and State of Virginia, have invented certain new and useful Improvements in Molding-Machines; and I do hereby declare the following to be a full, clear, and exact description of the invention, such as will enable others skilled in the art to which it appertains to make and use the same.

This invention relates to new and useful improvements in molding apparatus designed for general use in molding any article or articles which may be formed of plastic material in a matrix, and more particularly to be used in forming building-blocks, conduits for electric wires, and similar commodities of that general class.

The invention consists in features of novelty, in the general construction and arrangement, and in specific details of construction of the machine herein illustrated in the annexed drawings, in which—

Figure 1 represents a top plan view of one embodiment of my improved machine. Fig. 2 represents an enlarged plan view of the matrix-operating elements removed from the frame of the machine. Fig. 3 represents a view in side elevation of the same. Fig. 4 represents a view in side elevation of the entire mechanism. Fig. 5 represents a longitudinal vertical central section taken through the same. Fig. 6 represents a transverse vertical central section taken therethrough. Fig. 7 represents a similar view to Fig. 6 with the parts in their separated condition. Fig. 8 represents a view similar to Fig. 5 with the parts in their separated condition.

Referring to the drawings, A is a main supporting-frame for the machine.

B is a track extending substantially longitudinally of the frame A and from thence therebeyond to any suitable storage-room where the finished product is permitted to dry or in which, if desired, it may be baked.

C is a matrix-frame comprising four separate coöperating members, which may be of any required contour on their inner faces, according to the shape of the matrix to be held therebetween. A casing 50 incloses the members of the matrix C and is provided at each corner with upper and lower brackets 51 51. In each pair of brackets 51 is journaled a vertical rock-shaft 52, provided with a laterally-projecting arm 53, engaged by an operating-link 54. A stub-shaft 55 projects laterally from the middle of each of two opposite sides of the casing 50, and each of said shafts carries a rotatably-mounted sleeve 56, provided with laterally - projecting arms 57 57, each pivotally connected to a link 58, each link 58 having its free end pivotally connected to a link 59, and said latter link in turn pivotally engages the respective link 54. Thus it will be observed that by rocking the two sleeves 56 all four of the shafts 52 may be rocked, and the sleeves 56 are adapted to be operated simultaneously by links 60, each pivotally engaging an arm 61, fixed to and extending laterally from the respective sleeve 56. The links 60 pivotally engage laterally-projecting arms 62, carried by an operating-shaft 63, mounted in suitable journal-bearings 64, carried by one side of the casing 50. An operating-lever 65 is connected with the shaft 63 for facilitating rocking of the same, whereby vertical swinging of the said lever 65 is designed to impart longitudinal movement to the links 60, and consequently effect partial rotation of each of the sleeves 56 and through the chain of links described rock all of the shafts 52.

An arm 66 extends from each of the brackets 51, and from each arm 56 projects a stub-shaft 67, pivotally supporting a lever 68. Each lever 68 is pivotally connected with a link 69 at one end, and each link 69 at its opposite end pivotally engages a crank-arm 70, extending laterally from the respective rock-shaft 52. Each lever 68 at its end opposite that engaging link 69 pivotally engages a link 71, and each link 71 in turn engages a link 72, there being two upper and two lower links 72 at each of the two opposite sides of the casing 50, each of said links 72 extending through said casing and pivotally engaging the respective member of the matrix C. Upper and lower crank-arms 73 73 extend laterally from each rock-shaft 52, and each of said arms carries a link 74, pivotally connected to the outer end thereof, the opposite end of said link pivotally engaging a lever 75, each of said levers 75 being pivoted to a fulcrum-arm 76, projecting from the respective bracket 51 and preferably formed integral therewith. Each of the levers 75 has its end opposite that engaged by link 74 pivotally engaged by a link 77, which link is in turn engaged by a second link 78, extending through the respective side of the casing 50 and engaging the respective member of the matrix C, there being four links 78 for the respective members of the matrix C.

In assembling the mold-plates 1 the members of the matrix C must of course be retracted and then projected after the mold-plates have been positioned, and in order to accomplish this operation it is only necessary to pull down the lever 65 and then lift the same to its original position. Raising the lever 65 rotates the shaft 63, oscillates the rock-shafts 52, each of the links 59 being provided with a suitable guide 79 for limiting the same against lateral displacement. The rocking of the rock-shafts 52 actuates the chains of links and levers connected thereto and causes the members of the matrix C to be retracted. Lowering the lever 65 will of course reverse the movement of the parts and prevent the removal of the mold 1.

In practice the matrix or mold 1 is adapted to be filled with suitable material for forming a conduit-section or other article, and the material may be manually tamped therein upon a suitable pallet 12, and the matrix C, with the mold 1, is adapted to be elevated, as will hereinafter more fully appear, and the pallet 12 moved longitudinally of the frame for carrying the molded material into a discharging position, where the pallet, with its superposed conduit 2, may be removed by means of an elevating truck 3 of any preferred type.

The main frame A of the machine is provided with vertical guides 4 and 5, and within each of the guides 4 slides a vertically-extending rack-bar 6, which is connected to or formed integral with a bracket-section 7, which bracket-section is connected to the casing 50. Extending vertically through each of the sections 7 is a vertical channel 8, which forms a guide-way for the rack-bar 9, each of which rack-bars 9 extends downwardly through the guides 5 to and is connected with a cross-head 10, upon which is supported a core 11, designed to produce the longitudinal opening centrally through the conduit 2. The pallet 12 is adapted to be supported upon the extreme ends of the horizontal sliding rack-bars 13, said rack-bars being provided with guiding-lugs 14, serving as means for determining the proper position to be occupied by the pallet 12. Each rack-bar 13 lies in a longitudinal groove 13' in the respective side of the frame A and is adapted to be guided by such groove during its longitudinal reciprocation. Meshing with the teeth of said rack-bars 13 are pinions 15, fixedly carried by a shaft 16, suitably journaled transversely of the frame A and adapted to be actuated by a suitable crank 17, whereby the rack-bars 13 may be moved simultaneously longitudinally in either direction. The rack-bars 13 thus form, in effect, a conveyer for the finished product, and said conveyer is adapted to direct the finished product longitudinally of the frame A to a discharging position, beneath which is located a suitable track B, upon which travels an elevating-truck 3.

The truck 3 may be of any desired type; but I prefer to employ a structure involving a carriage 20, supported by carrying-wheels 21, resting upon tracks B, said carriage 20 being provided with hollow uprights 22, secured in position by transverse braces 23 and supporting a vertically-movable plate 24, guided in its vertical movement by vertically-depending shafts 25, carried by said plate and telescoping within the uprights 22. Vertically-moving bars 26 26 engage the under surface of the plate 24, and each of said bars is connected at its lower end to a link 27, and each link 27 in turn is pivotally connected to a lever 28, pivoted intermediate its length to one of the cross-braces 23. Depending from the free end of each lever 28 is a pivotally-connected link 29, each link 29 in turn being connected at its lower end to a crank-arm 30, extending laterally from a rock-shaft 31. The rock-shaft 31 is suitably journaled transversely of the carriage 20 and is adapted to be actuated by an arm 32, extending laterally therefrom and at its free end pivotally connecting with a link 33, the link 33 being in turn pivotally engaged by an operating-lever 34. The lever 34 may be of any suitable length and is pivoted, as at 35, to a fixed brace or bracket 36 for facilitating the actuation of the link 33 for causing the rods 26 to be moved vertically, whereby the plate 24 may be raised or lowered. Upon the plate 24 is arranged a suitable raceway 36, designed to guide suitable roller-bearings 37, carried by a turn-table 38, the said turn-table 38 being designed to receive the finished product of the present improved molding-machine. It will thus be observed that after the finished product has been delivered to the point of discharge the turn-table 38 may be elevated for lifting the pallet 12 and the product carried thereby above the lugs 14. The horizontal pivoting of turn-table 38 facilitates directing the pallet 12 off truck 3 onto a track arranged at an angle with respect to the track supporting said truck.

In order to facilitate the adaptation of the present improved mechanism to the manufacture of different styles of conduits and other articles, a cross-head 10, as best seen in Fig. 5, is preferably provided with means for securing the core 11 removably in place, such means being illustrated as a set-screw 11ª, the core being dovetailed onto the cross-head and locked in position by said screw 11ª. Thus the core 11 may be readily removed and any style of core replaced, as may be desired.

Journaled at each side of the frame A longitudinally thereof is a stub-shaft 39, extending between the racks 6 and 9. Each shaft 39 carries a pinion 40, meshing with both racks 6 and 9, and to each of said shafts 30 is also fixed a worm-gear 41, engaged by a worm 42, carried by a shaft 43, journaled transversely in the frame A and provided with suitable actuating-cranks 44. It will be observed that rotation of the cranks 44 will actuate the rack-bars 6 and 9 in opposite directions for causing the casing 50 and parts carried thereby to be moved upwardly while the head 10 is moved downwardly or for causing simultaneous opposite movement of said parts. Each of the rack-bars 9 is provided with a smooth extension 9ª, designed to engage the guideways in the casing 50 when the casing is at its highest point of elevation, said guideways in the casing 50 being engaged by the rack-bars 9 when the casing is lowered.

In operation, the parts being separated, as indicated in Fig. 7, a pallet is positioned upon the ends of rack-bars 13 between the lugs 14, and the cranks 44 are rotated for lowering the casing 50 and parts carried thereby and for raising the cross-head 10 and plunger 11. After the plunger has been elevated and the casing 50 lowered to the position indicated in Fig. 6 the material of which the conduit or other article is made is placed within the mold 1 and tamped therein, preferably manually. After a conduit is almost completed a cap 45 is secured to the upper end of the core 11 by means of a suitable screw 46, said cap being of the desired shape for producing an enlarged recess at the end of the conduit corresponding with the annular shoulder produced at the opposite end of the conduit-section by the particular shape of the pallet employed. During the filling of the mold any suitable hopper 47 may be applied to the upper edge of the mold 1 for facilitating the direction of the material into the same, and after the conduit-section has been completed said hopper 47 is removed and the cap 45 is also removed. Next the lever 65 is raised for causing the sections of matrix C to retract, and the mold-pieces of mold 1 are also drawn back, said mold-pieces being suitably connected with said sections of matrix, whereby the completed article is left free standing upon the pallet 12. The cranks 24 may now be rotated for lowering the core 11 and elevating the casing 50 and parts carried thereby until said parts assume the position indicated in Fig. 7. The crank 17 may now be operated for causing the rack-bars 13 to move the pallet 12, with its superposed conduit-section, to a point of discharge where the truck 3 receives and removes the same, as above set forth. After the pallet has been removed a second one may be applied and the operation continued, as described, the lever 65 being lowered before the filling operation commences.

Having thus fully described my invention, what I claim as new, and desire to secure by Letters Patent, is—

1. In a molding apparatus, a matrix-frame, a matrix therein, a guide-arm projecting downwardly from said frame, a core-support, a guide-arm extending upwardly from said core-support past said first-mentioned arm, and means engaging said arm for causing opposite longitudinal travel thereof.

2. In a molding apparatus, the combination with a frame, of a matrix carried thereby, means for moving said matrix out of the plane of a contained product, guideways in said frame, rack-bars within said guideways, a support carried by said rack-bars for the product within said matrix, and pinions engaging said rack-bars for moving said product from the plane of said matrix after movement of the matrix.

3. In a molding apparatus, the combination of a matrix-support, a core-support, a rack extending from said matrix-support, a rack extending from said core-support parallel to the first-mentioned rack, a shaft extending transverse between said racks, a gear carried by said shaft and meshing with both of said racks, a worm-gear carried by said shaft, and a worm meshing with said gear for actuating the same.

4. In a molding apparatus, the combination with a matrix-casing and movable sections of matrix therein, of an operating-shaft journaled transversely of said casing, a plurality of sleeves rotatably carried by said casing, means for rocking said shaft, means connected with the shaft for rocking said sleeves, a plurality of rock-shafts carried by said casing, means actuated by said sleeves for rocking said rock-shafts, and chains of links and levers connected with said rock-shafts for actuating said matrix-sections.

5. In a molding apparatus, the combination with a matrix-casing and movable sections of matrix therein, of a sleeve rotatably carried at one side of said casing, means for rocking said sleeve, links and levers connected with said movable sections of matrix, and connections between said sleeve and links and levers for imparting movement to said matrix-sections when said sleeve is rotated.

6. In a molding apparatus, the combination with a matrix having movable sides and ends, of a plurality of rotatably-mounted sleeves carried outside said matrix, means for oscillating said sleeves, and links and levers connected with said sleeves and with the movable sides and ends of said matrix for imparting movement to said sides and ends when the sleeves are oscillated.

In testimony whereof I hereunto affix my signature in presence of two witnesses.

WILLIAM J. STERLING.

Witnesses:
A. S. J. GAMMON,
J. LLOYD GORDON.